US009843066B2

(12) United States Patent
Snyder et al.

(10) Patent No.: US 9,843,066 B2
(45) Date of Patent: Dec. 12, 2017

(54) THIN FILM BATTERY ASSEMBLIES (71) Applicant: Apple Inc., Cupertino, CA (US)

(72) Inventors: Shawn William Snyder, Santa Clara, CA (US); Brian Menzel, Monte Sereno, CA (US); Bernd Jurgen Neudecker, Los Gatos, CA (US); Keiichiro Yumiba, San Carlos, CA (US); Timothy Wallen Scales, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 14/722,059

(22) Filed: May 26, 2015

(65) Prior Publication Data

US 2015/0349370 A1 Dec. 3, 2015

Related U.S. Application Data (60) Provisional application No. 62/003,506, filed on May 27, 2014.

(51) Int. Cl.
*H01M 10/02* (2006.01)
*H01M 10/04* (2006.01)
*H01M 2/20* (2006.01)
*H01M 2/26* (2006.01)
*H01M 10/0562* (2010.01)
*H01M 10/0585* (2010.01)
*H01M 10/05* (2010.01)

(52) U.S. Cl.
CPC ............ *H01M 10/02* (2013.01); *H01M 2/204* (2013.01); *H01M 2/266* (2013.01); *H01M 10/0436* (2013.01); *H01M 10/0562* (2013.01); *H01M 10/0585* (2013.01); *H01M 10/05* (2013.01); *H01M 2300/0068* (2013.01)

(58) Field of Classification Search
CPC ...... H01M 10/02; H01M 2/204; H01M 2/266; H01M 10/0436; H01M 10/0562; H01M 10/0585; H01M 10/05; H01M 2300/0068; H01M 2/20; H01M 2/202; H01M 2/206; H01M 2/208; H01M 2/14; H01M 2/26; H01M 2002/0205; H01M 10/045; H01M 10/0454; H01M 10/0472

See application file for complete search history.

(56) References Cited

U.S. PATENT DOCUMENTS

| 7,186,479 | B2 | 3/2007 | Krasnov et al. |
| 7,274,118 | B2 | 9/2007 | Jenson et al. |
| 2006/0216589 | A1* | 9/2006 | Krasnov ............ H01M 2/0404 429/175 |
| 2006/0267546 | A1* | 11/2006 | Shen ................. H01M 2/10 320/107 |
| 2007/0139001 | A1* | 6/2007 | Hahn ................. H01M 2/0277 320/112 |

(Continued)

*Primary Examiner* — Gregg Cantelmo
(74) *Attorney, Agent, or Firm* — Young Basile Hanlon & MacFarlane, P.C.

(57) ABSTRACT

Solid-state battery structures and methods of manufacturing solid-state batteries, such as thin-film batteries, are disclosed. More particularly, embodiments relate to solid-state batteries having an intermediate adhesive layer between several electrochemical cells. In an embodiment, an anode current collector at least partially fills a notch in a periphery of the intermediate adhesive layer. Other embodiments are also described and claimed.

12 Claims, 6 Drawing Sheets (56) References Cited

U.S. PATENT DOCUMENTS

| | | |
|---|---|---|
| 2009/0136839 A1 | 5/2009 | Kraznov et al. |
| 2011/0076550 A1* | 3/2011 | Liang .................. H01M 2/0202 429/175 |
| 2014/0106203 A1 | 4/2014 | Shih et al. |
| 2014/0106216 A1 | 4/2014 | Liang |

* cited by examiner

THIN FILM BATTERY ASSEMBLIES

This application claims the benefit of U.S. Provisional Patent Application No. 62/003,506, filed May 27, 2014, and this application hereby incorporates herein by reference that provisional patent application.

BACKGROUND

Field

Embodiments relate to electrochemical devices and methods of manufacturing electrochemical devices. More particularly, embodiments relate to solid-state electrochemical devices, including batteries, having an intermediate adhesive layer between several electrochemical cells.

Background Information

Solid-state batteries, such as thin-film batteries, are known to provide better form factors, cycle life, power capability, and safety, as compared to conventional battery technologies. Solid-state battery structures and manufacturing methods, however, may be further optimized to improve battery energy density.

Energy density of a solid-state battery compares the energy availability in electrochemical cells, or stacks of electrochemical cells in an electrochemical device, in relation to the device mass or volume. One factor that can affect energy density is a height of a cell stack. More particularly, energy density may be increased by reducing the space taken in a vertical (or height) direction by elements of the cell stack that do not contribute to power production.

SUMMARY

Embodiments of solid-state battery structures are disclosed. In an embodiment, an electrochemical device, such as a solid-state battery, includes an adhesive layer between a first electrochemical cell and a second electrochemical cell. The first electrochemical cell may have a first electrolyte layer between a first anode layer and a first cathode layer. The second electrochemical cell may have a second electrolyte layer between a second anode layer and a second cathode layer. The adhesive layer may include a gap or notch in (or at) its periphery. In one embodiment, there is an anode current collector between the first anode layer and the second anode layer that at least partially fills the gap in the adhesive layer. For example, the anode current collector may have a first portion that lies between the first anode layer and the second anode layer, and a second portion that is positioned outward of the peripheries of the first anode layer and the second anode layer. The peripheral portion of the anode current collector that lies between the anode layers may conform to and/or abut a portion of the periphery of the adhesive layer. In an embodiment, the adhesive layer and the anode current collector may have a same thickness between the first electrochemical cell and the second electrochemical cell. The adhesive layer may include a layer of pre-formed pressure sensitive adhesive that attaches to one or both of the anode layers of the two electrochemical cells; the pre-formed pressure sensitive adhesive layer may have one or more notches formed along its perimeter or edge that are at least partially filled by the anode current collector.

In an embodiment, a first electrochemical cell may have an electrically conductive sidewall along an outer edge of its first cathode layer. An anode current collector may extend outward or protrude from the first electrochemical cell beyond the electrically conductive sidewall such that a gap exists between the sidewall and the anode current collector. An insulator may be located on the anode current collector, within the gap between the anode current collector and the sidewall, to reduce the likelihood of electrical shorting between the anode current collector and the first cathode layer.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Embodiments describe structures and manufacturing methods for solid-state batteries, e.g., thin-film batteries. However, while some embodiments are described with specific regard to manufacturing processes or structures for integration within a solid-state battery, the embodiments are not so limited, and certain embodiments may also be applicable to other uses. For example, one or more of the embodiments described below may be used to manufacture other layered elements, such as silicon-based solar cells.

In various embodiments, description is made with reference to the figures. Certain embodiments may, however, be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

In an aspect, an electrochemical device may include two electrochemical cells bonded together by an intermediate adhesive layer. The intermediate adhesive layer includes one or more gaps or notches in its periphery into which an anode current collector is placed, such that the anode layers of the stacked electrochemical cells (with which the intermediate adhesive layer is in contact) are placed in electrical contact with the anode current collector. The anode current collector and the adhesive layer may have essentially the same thickness to thereby uniformly separate the anode layers across the anode layer surface area. This may enable the adhesive layer and the anode current collector to be nested so as to more fully utilize device space in a z-direction and thus reduce z-height impact of the structure. The intermediate adhesive may be a pressure-sensitive adhesive to enable the electrochemical cells to be bonded firmly together without the need for curing or treatment steps.

Figure 1:
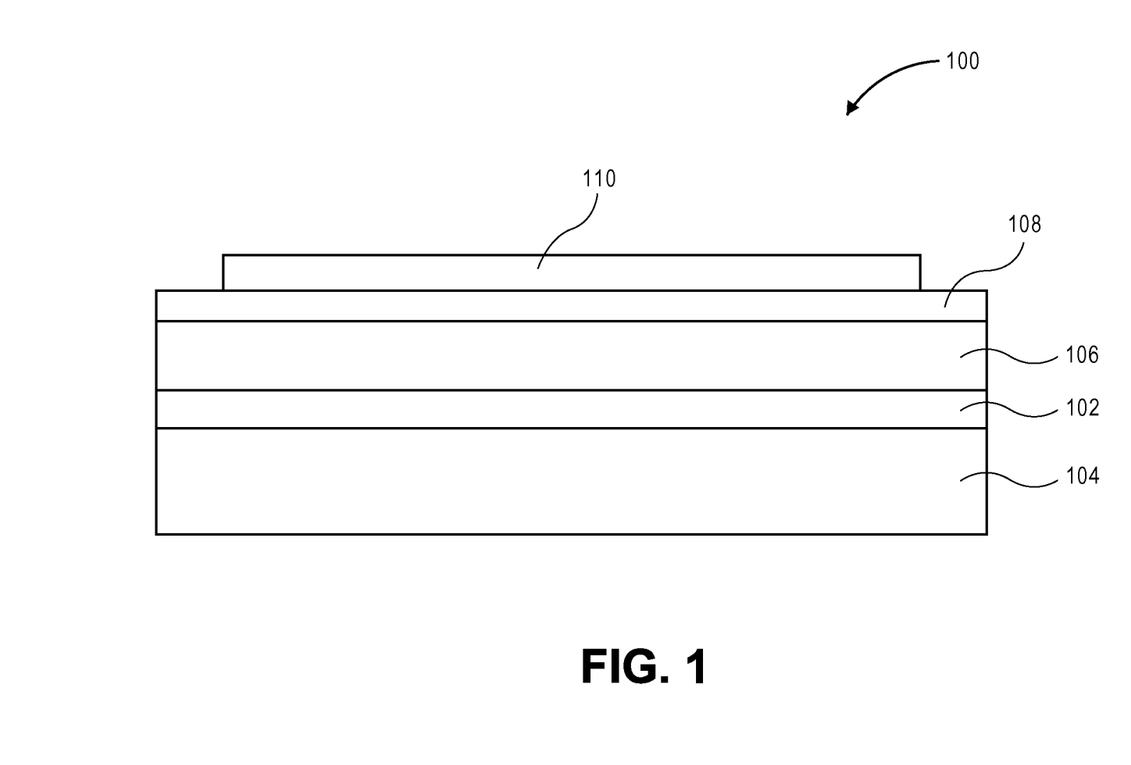
FIG. 1 is a side view of an electrochemical cell in accordance with an embodiment.

Referring to FIG. 1, a side view of an electrochemical cell is shown in accordance with an embodiment. The electrochemical cell 100 may include an electrolyte layer 108 between an anode layer 110 and a cathode layer 106. The cathode layer 106 may, for example, include $LiCoO_2$, $LiMn_2O_4$, $LiMnO_2$, $LiNiO_2$, $LiFePO_4$, $LiVO_2$, or any mixture or chemical derivative thereof. The electrolyte layer 108 may facilitate ion transfer between the cathode layer 106 and the anode layer 110. Accordingly, the electrolyte layer 108 may be a solid electrolyte, which may not contain any liquid components and may not require any binder or separator materials compounded into a solid thin film. For example, the electrolyte layer 108 may include lithium phosphorous oxynitride (LiPON) or other solid state thin-film electrolytes such as $LiAlF_4$, $Li_3PO_4$ doped $Li_4SiS_4$. The anode layer 110 may, for example, include lithium, lithium alloys, metals that can form solid solutions or chemical compounds with lithium, or a so-called lithium-ion compound that may be used as a negative anode material in lithium-based batteries, such as $Li_4Ti_5O_{12}$.

In an embodiment, the cathode layer 106 may be electrically connected with a cathode current collector 104, which may be an electrically conductive layer or a tab. Similarly, the anode layer 110 may be electrically connected with an anode current collector (not shown), which may be an electrically conductive layer or a tab. Optionally, one or more intermediate layers may be disposed between the cathode layer 106 or the anode layer 110, and its respective current collector. For example, a barrier film layer 102 may separate the cathode layer 106 from the cathode current collector 104. For example, the barrier film layer 102 may be in direct physical contact with both the cathode layer 106 and the cathode current collector 104. The barrier film layer 102 may reduce the likelihood of contaminants and/or ions from diffusing between the cathode current collector 104 and the cathode layer 106. Thus, the barrier film layer 102 may include materials that are poor conductors of ions, such as borides, carbides, diamond, diamond-like carbon, silicides, nitrides, phosphides, oxides, fluorides, chlorides, bromides, iodides, and compounds thereof. Alternatively, an additional intermediate layer, such as a substrate layer, may be disposed between the cathode layer 106 and the cathode current collector 104. The substrate layer may, for example, provide electrical connectivity between the cathode layer 106 and the cathode current collector 104 and may also provide structural support, e.g., rigidity, to the electrochemical cell 100. Accordingly, the substrate layer may include a metal foil or another electrically conductive layer.

In some instances, the electrochemically active layers of the cell may be formed on one side of a substrate layer, e.g., using material deposition techniques such as physical vapor deposition, and the cathode current collector 104 may be formed separately and physically coupled to another side of the substrate layer. In other instances, the electrochemically active layers of the cell may be formed on the substrate layer, and then the electrochemically active layers may be removed from the substrate layer and physically coupled to the separately formed cathode current collector 104. In still other instances, the electrochemically active layers of the cell may be formed, e.g., physical vapor deposited, directly on the cathode current collector 104. Thus, there are many different ways to create an electrochemical cell 100 having a plurality of electrochemically active layers.

The electrochemical cell 100 may be a thin film battery cell, whose layers are thin. For example, the cathode current collector 104 may have a thickness in a range of between 10 to 100 μm, e.g., 50 μm. The composite electrochemical cell 100 may have a total thickness in a range of between 13 to 300 μm. For example, the barrier film layer 102, cathode layer 106, electrolyte layer 108, and anode layer 110 may combine to have a thickness in a range of between 3 to 290 μm, e.g., 25 μm.

Figure 2:
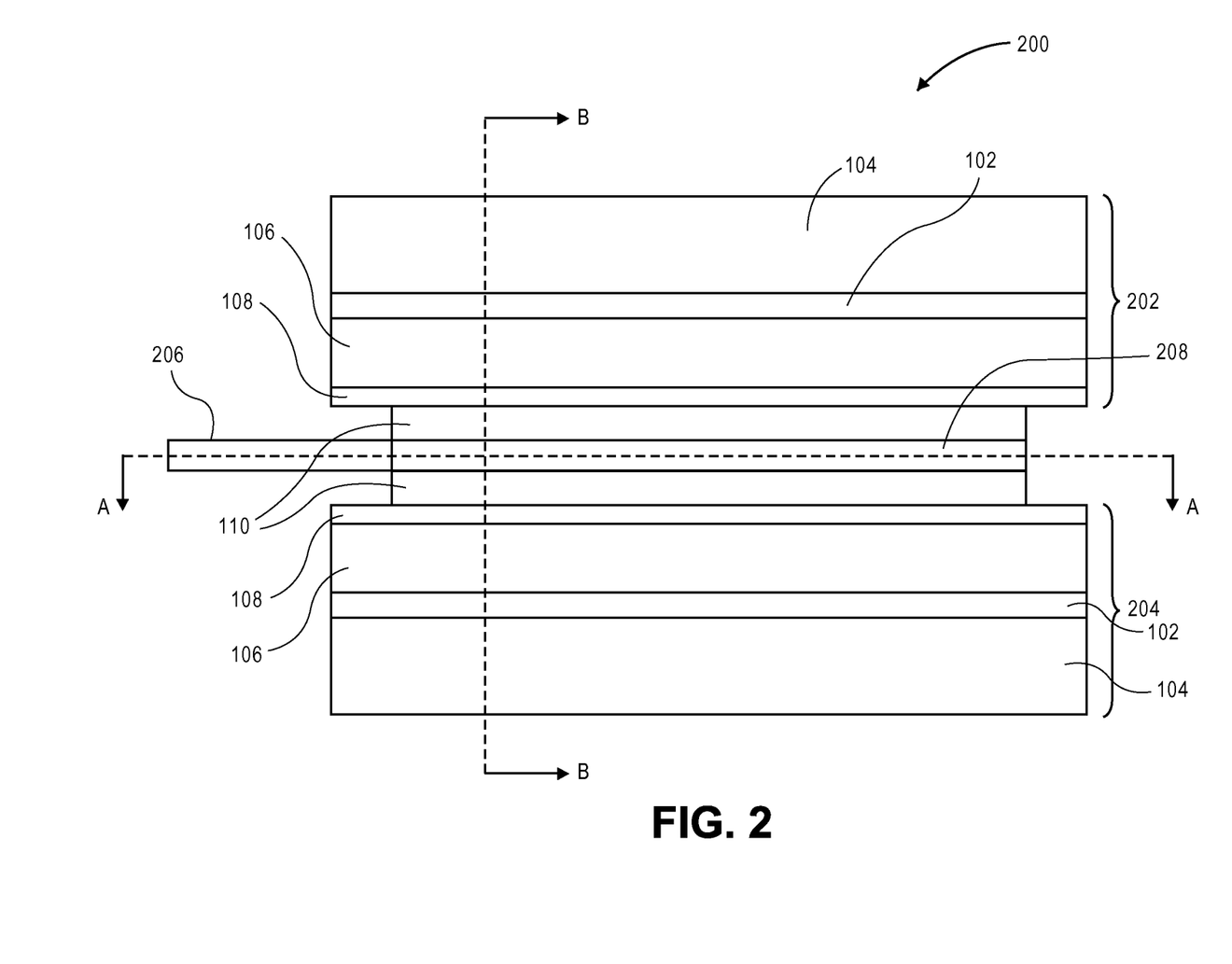
FIG. 2 is a side view of an electrochemical device in accordance with an embodiment.

Referring to FIG. 2, a side view of an electrochemical device is shown in accordance with an embodiment of the invention. A first electrochemical cell 202 and a second electrochemical cell 204 may be physically and/or electrically connected to form an electrochemical device 200. Each electrochemical cell may include several layers as described above, e.g., a cathode current collector 104, a cathode layer 106, an electrolyte layer 108, and an anode layer 110. Respective anode layers 110 of the first electrochemical cell 202 and the second electrochemical cell 204 may be placed in electrical contact with each other, and located between the cathode layers 106, to form a stack of at least two electrochemical cells 202, 204. In an embodiment, the electrochemical device 200 may include one or both of an anode current collector 206 or an adhesive layer 208 between the first electrochemical cell 202 and the second electrochemical cell 204. The anode current collector 206 or adhesive layer 208 between the respective anode layers 110 may be directly contacted by both of the anode layers 110. For example, the anode current collector 206 may placed in physical and/or electrical contact with one or both of the respective anode layers 110 of the first and second electrochemical cells 202, 204. Alternatively, there may be one or more intermediate layers between at least one of the anode layers 110 and the anode current collector 206 or the adhesive layer 208. In an embodiment, the adhesive layer 208 physically couples the anode layers 110 to one another, i.e., a first side of the adhesive layer 208, e.g., a top side, forms an adhesive bond with an anode layer 110 of the first electrochemical cell 202, and a second side of the adhesive layer 208, e.g., a bottom side, forms an adhesive bond with an anode layer 110 of the second electrochemical cell 204.

In an embodiment, there are gaps, portals, or openings formed in at least a portion of the adhesive layer 208 to permit at least portions of the respective anode layers 110 of the first and second electrochemical cells 202, 204 to reach through the adhesive layer 208 to make physical contact with one another. For example, a circular portal may be formed through adhesive layer 208 and located near a center of adhesive layer. The portal may pass through adhesive layer 208 perpendicular to a top side of the layer, i.e., may pass through a thickness of adhesive layer 208. Accordingly, when adhesive layer 208 is placed between respective anode layers 110, the material forming anode layers 110 may deform into and across the thickness of adhesive layer 208 within the portal until the anode layers make physical contact.

Figure 3:
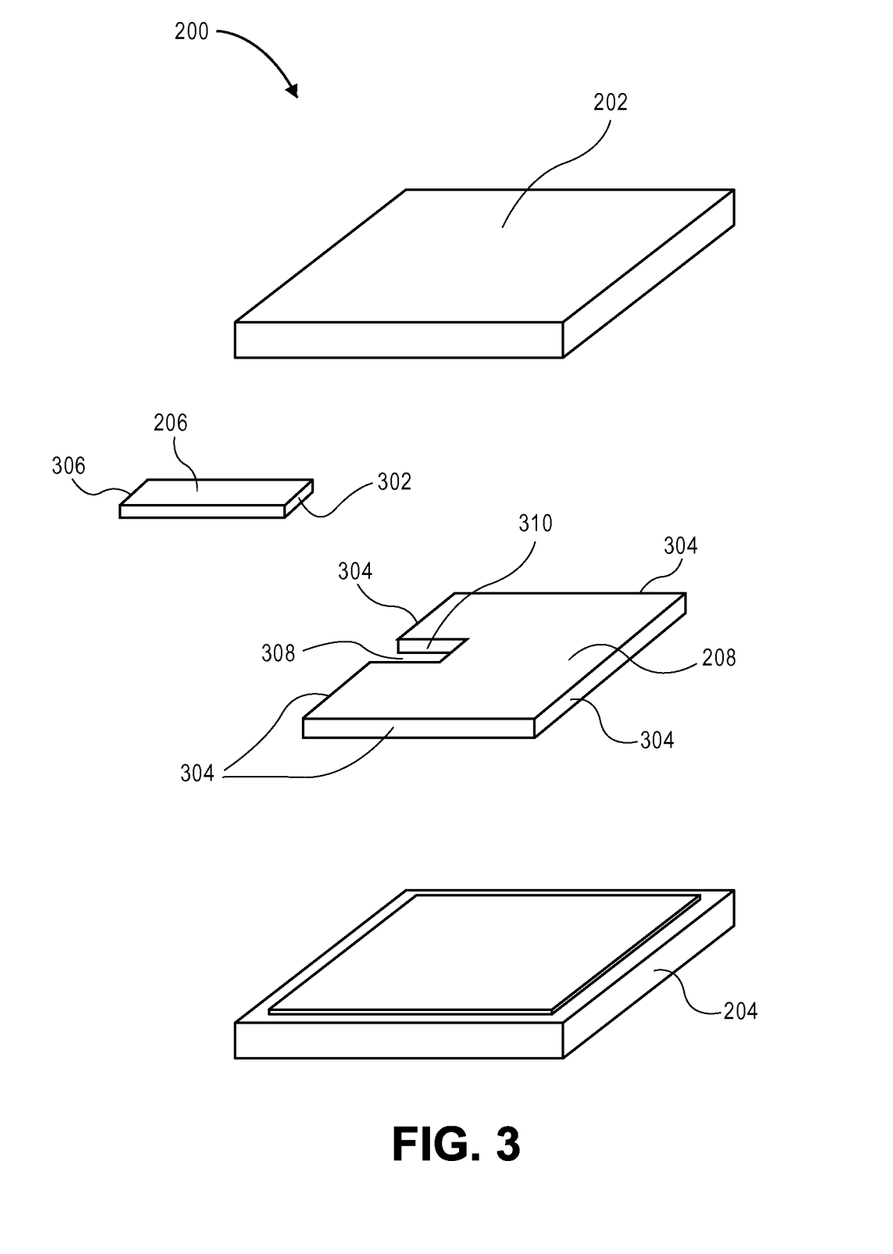
FIG. 3 is an exploded view of an electrochemical device in accordance with an embodiment.

Referring to FIG. 3, an exploded view of an electrochemical device is shown in accordance with an embodiment. Separating first electrochemical cell 202 and second electrochemical cell 204 reveals the anode current collector 206 and the adhesive layer 208. In an embodiment, the anode current collector 206 has a tab structure, e.g., a rectangular tab structure. The tab structure may, however, include any of a variety of different shapes, such as other polygonal shapes beside rectangular, circular or curvilinear outer perimeter shapes, etc. The anode current collector 206 may be formed from an electrically conductive material. For example, the anode current collector 206 may be a copper or nickel tab.

The adhesive layer 208 may include an adhesive that bonds the first electrochemical cell 202 to the second electrochemical cell 204. The adhesive layer 208 may incorporate one or more adhesives that bond an anode layer 110 of the first electrochemical cell 202 to an anode layer 110 of the second electrochemical cell 204 when the adhesive is located between the anode layers 110. More particularly, shear holding between the electrochemical cells may be provided by the adhesive layer 208.

The adhesive layer 208 may incorporate one or more types of adhesives. For example, the adhesive layer may include pressure sensitive adhesive. Accordingly, the adhesive may be manufactured with either a liquid carrier or in a fully solid form. Suitable pressure sensitive adhesive materials may include an elastomer compounded with a suitable tackifier. For example, adhesive layer 208 may include a pressure sensitive adhesive having elastomers based on acrylics, styrene block copolymers, or vinyl ethers. These are only examples, however, and elastomers may be based on other materials, such as ethylene-vinyl acetate, nitriles, silicone rubbers, etc. The adhesive layer 208 may also include other adhesives, including drying adhesives, contact adhesives, hot adhesives, and/or reactive adhesives, instead of or in addition to pressure sensitive adhesive. Adhesive layer 208 may have several layers laminated together. For example, adhesive layer may include a central substrate layer between an upper layer having a first adhesive and a lower layer having a second adhesive.

In an embodiment, the adhesive layer 208 is electrically conductive, either via the adhesive materials incorporated in the adhesive layer 208 or conductive fillers added to the adhesives, to provide for electrical conductivity between the bonded components of the electrochemical device 200, e.g., the anode layers 110 and/or an anode current collector 206.

The adhesive used in the adhesive layer may be selected or designed to provide permanent bonding between the electrochemical cells 202, 204. However, the adhesive may also be selected or designed to provide removable bonding between the electrochemical cells. Accordingly, the adhesive may be designed to achieve any desired bond based on the product application.

In an embodiment, the adhesive layer 208 may be preformed, e.g., cured, prior to being applied to the electrochemical cells 202, 204. For example, the adhesive layer 208 may include a two-sided pressure sensitive adhesive that may be alternately bonded to the first electrochemical cell 202 and then to the second electrochemical cell 204. Alternatively, the adhesive layer 208 may include a drying adhesive that may be deposited over a surface, e.g., an anode layer 110, of the first electrochemical cell 202, and then a surface, e.g., an anode layer 110, of the second electrochemical cell 204 may be brought into contact with the exposed side of the adhesive before the adhesive dries. That is, the electrochemical cells 202, 204 may be bonded together by applying a film of uncured adhesive between the cells and then curing the adhesive to create an adhesive bond. Other adhesives and adhesive curing techniques may be used to dispose the adhesive layer 208 between the electrochemical cells 202, 204.

The anode current collector 206 and the adhesive layer 208 may fill at least a portion of a space between respective anode layers 110 of the electrochemical cells 202, 204. For example, a portion of the anode current collector 206 may be located within a gap or notch 308 that is formed in a periphery of the adhesive layer 208, to at least partially fill the space defined by the gap 308 (between respective anode layers 110 of the electrochemical cells 202, 204). The periphery of adhesive layer 208 may include a side surface of adhesive layer 208, e.g., as in the sidewall of a flat film layer, that extends between an upper and lower planar surface of the layer around a perimeter of adhesive layer 208. More particularly, the first portion 302 of anode current collector 206 may fill the space. That is, the first portion 302 may be considered to be that portion of anode current collector 206 that fills a portion of the gap 308. The first portion 302 may lie between a first anode layer 110 and a second anode layer 110 of respective electrochemical cells 202, 204. Accordingly, the first portion 302 may be considered to be positioned inward of the peripheries of the anode layers 110, as compared to a second portion 306 of anode current collector 206, which is positioned outward of the peripheries.

The first portion 302 may be in electrical connection with both of the anode layers 110. In an embodiment, an edge of the first portion 302 of the anode current collector 206 may be located adjacent to an edge or side of the adhesive layer 208 that resides within the gap, e.g., adjacent to a gap perimeter edge 310. The gap perimeter edge 310 may be an edge or sidewall of the adhesive layer 208 that extends around and defines gap 308. For example, in an embodiment having a rectangular gap 308 as shown in FIG. 3, the gap perimeter edge 310 may include the three sidewalls that are formed in adhesive layer 208 when a notch, i.e., gap 308, is punched, cut, or otherwise formed in the adhesive layer 208 body. In an embodiment, spaces or voids may exist between the sides of the first portion 302 of the anode current collector 206, i.e., the portion of anode current collector 206 within gap 308, and the perimeter or edge 310 of the adhesive layer 208 within the gap 308. In another embodiment, however, these spaces or voids may be reduced so that the gap 308 is essentially filled in its entirety with the first portion 302 of the anode current collector 206. Said differently, in an embodiment, the first portion 302 may essentially abut a side of the adhesive layer 208 that defines the gap 308, but in other embodiments, there may be some space between the first portion 302 and the side of the adhesive layer 208.

In an embodiment, the space between first electrochemical cell 202 and second electrochemical cell 204 within the gap 308 may be fully occupied by the anode current collector 206. To reduce or eliminate spaces or voids between the peripheries or sides of the first portion 302 of the anode current collector 206 and the gap 308 of the adhesive layer 208, the first portion 302 and gap 308 may have respective shapes that complement each other. For example, a shape or profile of the first portion 302 may conform to a shape or profile of the gap 308. In this way, the anode current collector 206 may mate or engage with the adhesive layer 208 to form a unified body. As an example, the anode current collector 206 may have a rectangular profile with the first portion 302 opposite the tab body from the second portion 306. Second portion 306 may be that portion of anode current collector 206 that is positioned outward of the peripheries of the anode layers 110. For example, while first portion 302 may be adjacent to and/or in contact with gap perimeter edge 310, second portion 306 may be outward from and not in contact with gap perimeter edge 310. A rectangular profile is provided by way of example, and the anode current collector 206 may have any shape that may be mated to a gap 308 in the adhesive layer 208. The gap 308 may be a slot, a notch, or the like, formed in the adhesive layer 208 using known fabrication techniques, e.g., laser or mechanical machining operations. Alternatively, the adhesive layer 208 may be deposited over a cell surface, as described below, and thus, the gap 308 may be formed by masking, gating, or otherwise controlling the shape of a deposited adhesive used to form the adhesive layer 208. In an embodiment, the gap 308 includes a shape similar or identical to the first portion 302. For example, the gap 308 may have a generally rectangular shape with a width that matches a width of the anode current collector 206. Thus, the anode current collector 206 may nest within the gap 308 with the first portion 302 filling at least a portion of the gap, e.g., with a perimeter or edge of the first portion 302 placed in contact with a perimeter or edge 310 of the gap 308. Accordingly, when the anode current collector 206 is fit into the gap 308 of the adhesive layer 208, the gap 308 may be entirely filled such that the anode current collector 206 and adhesive layer 208 form a unified body. Here, a unified body refers to a body that includes at least two portions (an anode current collector 206 and an adhesive layer 208) that are contiguous with each other to form an external surface that is continuous at all points, e.g., even across the border at which the portions meet. Furthermore, with the anode current collector 206 nested within the gap 308, i.e., either partially or fully filling the gap 308 between the electrochemical cells 202, 204, the second portion 306 of the anode current collector 206 may extend away or outward of a perimeter or side 304 of the adhesive layer 208. In an embodiment, the second portion 306 of the anode current collector 206 may also extend away or outward of a perimeter, side, or edge of the electrochemical cells 202, 204.

In an embodiment, the adhesive layer 208 may include several gaps 308 between electrochemical cells 202, 204, and each of the gaps 308 may be partially or fully filled by a respective anode current collector 206. For example, a first portion 302 of a first anode current collector 206 may fill at least a portion of a first gap 308 formed along perimeter or edge 304 of the adhesive layer 208. Similarly, a first portion 302 of a second anode current collector 206 may fill at least a portion of a second gap 308 formed along the perimeter or edge 304 of the adhesive layer 208. Accordingly, the first anode current collector 206 and the second anode current collector 206 may be used to make electrical connection to different external components, e.g., to external product circuitry or to another anode layer associated with a different electrochemical cell or device.

Figure 4:
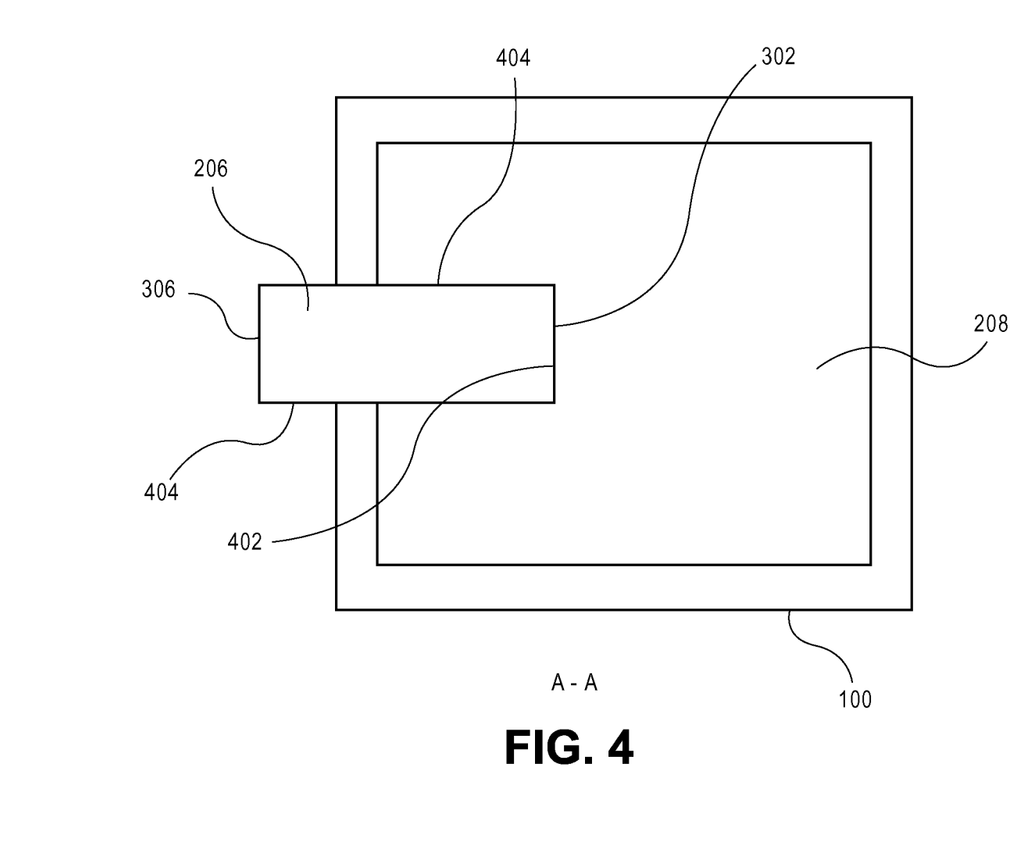
FIG. 4 is a cross-sectional view, taken about line A-A of FIG. 2, of an electrochemical device in accordance with an embodiment.

Referring to FIG. 4, a cross-sectional view, taken about line A-A of FIG. 2, of an electrochemical device is shown in accordance with an embodiment. The first portion 302 of the tab 206 may physically contact an inward adhesive perimeter edge 402. Similarly, lateral sides 404 along a perimeter of the first portion 302 of the anode current collector 206 may be in physical contact with a perimeter or side of the gap 308 within the adhesive layer 208. Thus, essentially all of the perimeter or side of the adhesive layer 208 within gap 308 may be in contact with the anode current collector 206 to entirely fill the gap 308. In an embodiment, the anode current collector tab 206 and the adhesive layer 208 may be co-punched to ensure that the adhesive layer 208 touches the edges of the anode current collector 206 over essentially all of the gap perimeter edge 310. Physical contact between the adhesive layer 208 and the anode current collector 206 may create an adhesive bond between the adhesive layer 208 and the anode current collector 206 that retains the anode current collector 206 in position when tensile loads are applied that tend to pull away the parts during use. Thus, dislodgment of the anode current collector 206 from the electrochemical device 200 may be prevented by bonding together the edges of the anode current collector 206 and the sides of the adhesive layer 208 within the gap 308.

In other embodiments, the anode current collector 206 may have a different shape, e.g., circular, square, or different polygonal shapes. The gap 308 in the adhesive layer 208 may have a mating shape, i.e., one that conforms to the periphery of the anode current collector 206. For example, in an embodiment, the anode current collector 206 is circular and the gap 308 may be partially circular, e.g., semi-circular, with a same radius as the anode current collector 206 to allow a first portion 302 of the anode current collector 206 to nest within the gap 308 and a second portion 306 of the anode current collector 206 to extend away from or outward of a periphery of the adhesive layer 208.

Regardless of the anode current collector 206 shape, the second portion 306 of the anode current collector 206 may be exposed away from the adhesive layer 208 and the underlying electrochemical cell, to allow for electrical contact to be made between the anode current collector 206 and other product circuitry. Furthermore, the anode current collector 206 may initially extend away from the electrochemical cell by an extension distance, e.g., 10 to 20 mm, and then be trimmed back such that the second portion 306 extends only, for example, 2 to 10 mm, from the outer edge of the electrochemical cell.

Figure 5:
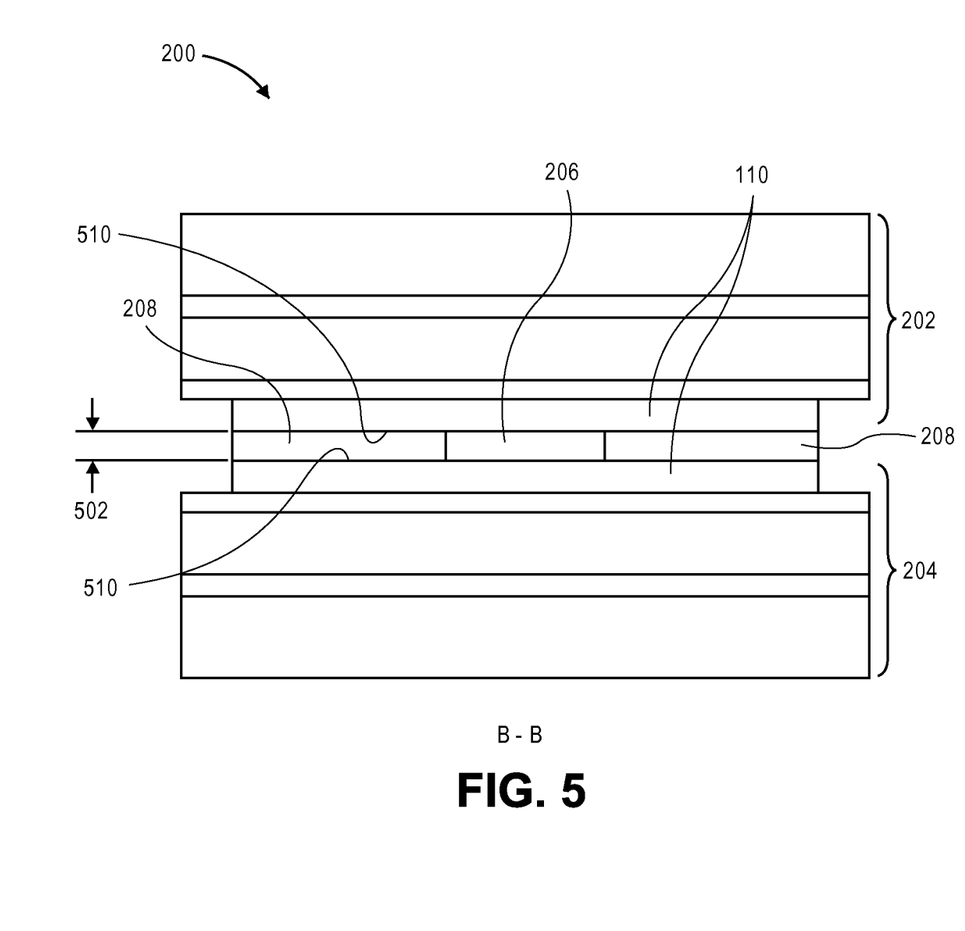
FIG. 5 is a cross-sectional view, taken about line B-B of FIG. 2, of an electrochemical device in accordance with an embodiment.

Referring to FIG. 5, a cross-sectional view, taken about line B-B of FIG. 2, of an electrochemical device is shown in accordance with an embodiment. To further eliminate unused space between the electrochemical cells 202, 204 and reduce z-height impact on the electrochemical device 200, the anode current collector 206 and the adhesive layer 208 may have similar thicknesses in the z-direction. For example, a thickness 502 of the anode current collector 206 may be the same as the thickness 502 of the adhesive layer 208. Thus, when the anode current collector 206 is nested within the gap 308 of the adhesive layer 208, the resulting layer may have a consistent thickness 502, and therefore, separation between respective anode layers 110 may be the same across the mating surfaces of the electrochemical cells 202, 204. More particularly, the anode layers 110 may each include respective anode surfaces 510, e.g., the planar surfaces that face each other, and the anode surfaces 510 may be separated by the thickness 502 of the resulting layer. In an embodiment, the anode current collector 206 and the adhesive layer 208 may each have a thickness 502 in a range of between 5 to 25 μm. For example, both the anode current collector 206 and the adhesive layer 208 may have a thickness 502 of 10 μm. Accordingly, the facing surfaces of the anode layers 110 of the electrochemical cells 202, 204 may be uniformly spaced apart from each other by a separation distance equal to the thickness 502 of the anode current collector 206 (across a first portion of the facing surfaces) and adhesive layer 208 (across a second portion of the facing surfaces).

Electrical shorting (or strictly speaking, electronic shorting) between layers of electrochemical cells 202, 204 may be caused whenever electrical connection is made between the anode current collector 206 and other layers, e.g., cathode layer 106. Such connection may be through direct contact between the anode current collector 206 and the other layer, e.g., when the anode current collector 206 is bent during use and contacts the other layer. In other cases, melting, reflowing, and redeposition of electrochemical cell layer materials may be caused by, e.g., laser cutting operations used during solid-state battery manufacturing, which can result in ejected slag forming a short circuit between cell layers. Thus, since an electrical short can disable an electrochemical cell and reduce performance of an electrochemical device, there may be a need to prevent electrical contact between the anode current collector 206 and other layers of the electrochemical cells 202, 204.

Figure 6:
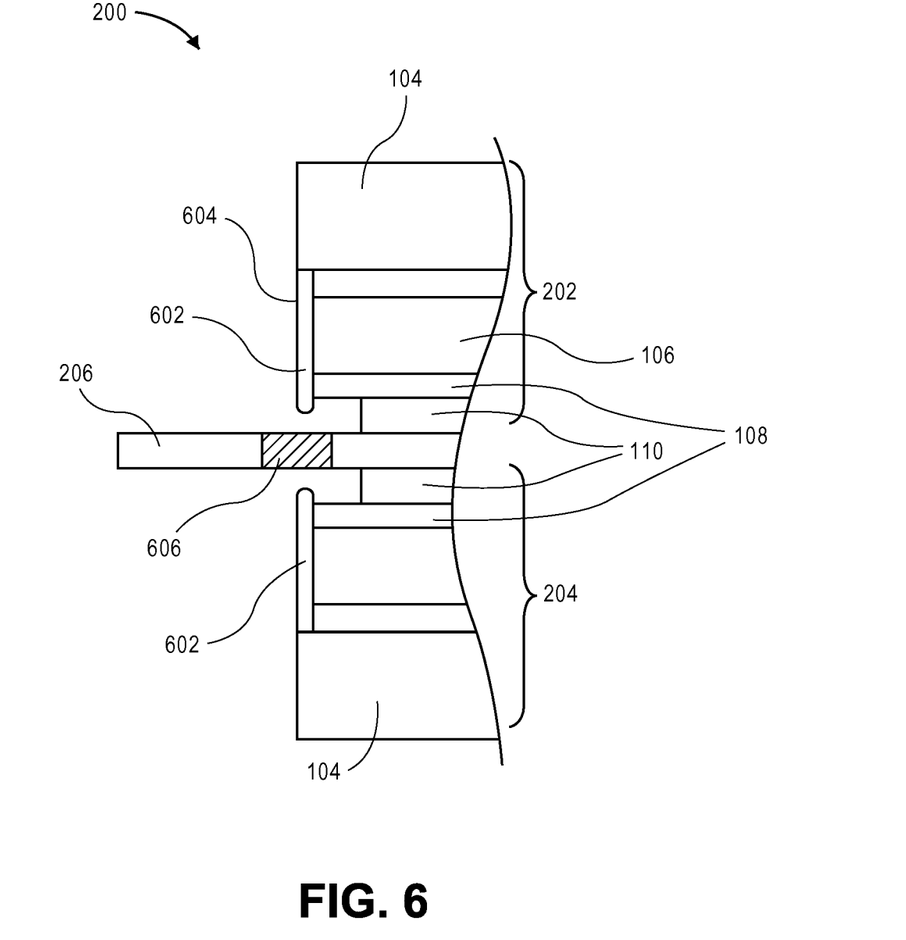
FIG. 6 is a partial cross-sectional view of an electrochemical device having an insulated anode current collector in accordance with an embodiment.

Referring to FIG. 6, a partial cross-sectional view of an electrochemical device having an insulated anode current collector is shown in accordance with an embodiment. In an embodiment, a laser cutting operation may eject slag that is redeposited as a slag layer 602 along a sidewall 604 of first electrochemical cell 202 and/or second electrochemical cell 204. The slag layer 602 may extend from the cathode current collector 104 along an outer edge of the electrochemical cell, e.g., an outer edge of the cathode layer 106, toward the anode current collector 206. For example, the slag layer 602 may be material that is redeposited directly from the cathode current collector 104, or it may be reflowed material from a substrate layer that is replaced by the cathode current collector 104 during fabrication of the electrochemical cell. Thus, the exposed surface of the slag layer 602 may form a sidewall 604 of an electrochemical cell of the assembled electrochemical device 200. As a result, if an electrically conductive portion of the anode current collector 206 were to contact the slag layer 602, a short may form between two or more layers of the electrochemical cell. In particular, when both the anode current collector 206 and the slag layer 602 are formed of conductive material, touching them together may cause an electrical short between the anode current collector 206 and the cathode layer 106. Similarly, touching the anode current collector 206 and the slag layer 602 together may cause an electronic short between them. As described above, shorting may occur even in the absence of the slag layer 602, and so, the slag layer 602 is being provided only as one example.

In an embodiment, the anode current collector 206 may include an insulator 606 over at least a portion of an exposed surface to reduce the likelihood of shorting with the slag layer 602 on the sidewall 604, or any other layer, of the electrochemical cells 202, 204. For example, a region of anode current collector 206 exposed away from the anode layers 110 surface may be covered with an insulator 606 to reduce the likelihood of electrical shorting between the anode current collector 206 and another layer of the electrochemical device 200. The insulator 606 may cover at least a portion of the anode current collector 206 to reduce the likelihood that slag layer 602 will touch the anode current collector 206. Thus, the likelihood of electrical shorting in the electrochemical device 200 may also be reduced. The insulator 606 may include any number of insulating materials and may be applied to the anode current collector 206 in numerous manners. For example, the insulator 606 may be a parylene film that is chemical vapor deposited over the anode current collector 206 adjacent to the slag layer 602 and/or between the sidewalls 604 of the first and second electrochemical cells 202, 204. Alternatively, the insulator 606 may include a heat shrink tubing, e.g., a polyolefin heat shrink tube, which may be located over and shrunk around the anode current collector 206. Furthermore, the insulator 606 may be an insulating tube, such as a polyimide tube, bonded over the anode current collector 206 at the appropriate location to reduce the likelihood of electrical shorting between the anode current collector 206 and the slag layer 602 and/or the cathode current collector 104.

In an embodiment, a method of manufacturing an electrochemical device 200 having an intermediate adhesive layer 208 is provided. In an operation, a first electrochemical cell 202 and a second electrochemical cell 204 are formed. The cells may have equal footprints, e.g., square profiles, to allow them to be stacked without having an overlap of one cell edge beyond another cell edge. The cells may, however, also have different shapes and/or sizes.

In an operation, the adhesive layer 208 may be formed from a pressure sensitive adhesive, e.g., an electrically conductive pressure sensitive adhesive. For example, the adhesive layer 208 shape may be cut from a pressure sensitive adhesive film being carried on a carrier film. The gap 308 may be formed in the pressure sensitive adhesive film in a shape identical to at least a portion of the anode current collector 206. For example, the gap 308 may be a slot or a notch formed through the adhesive film. In an operation, an exposed adhesive surface of the shaped pressure sensitive adhesive film may be pressed against an anode layer 110 of the first electrochemical cell 202. The adhesive layer 208 perimeter may be aligned with a perimeter of the anode layer 110 to fully utilize the surface area of the adhesive layer 208 and the anode layer 110. For example, in the case of a rectangular adhesive layer 208 and anode layers 110 as shown in FIG. 3, the sides of the rectangles may be aligned and the adhesive layer 208 and anode layers 110 may be centered with respect to each other along a same axis perpendicular to their planar surfaces. After applying light pressure, the carrier film may be peeled away from the adhesive layer 208, leaving the adhesive layer 208 in place over the anode layer 110 of the first electrochemical cell 202.

In an operation, the anode current collector 206 may be inserted into the gap 308 formed in the adhesive layer 208. Contact may be made between the first portion 302 of the anode current collector 206 and an inward edge of the gap 308 to nest the anode current collector 206 within the adhesive layer 208. The anode current collector 206 may contact the adhesive layer 208 with sufficient pressure to initiate an adhesive bond that retains the anode current collector 206 within the gap 308.

In an operation, the second electrochemical cell 204 may be stacked on the first electrochemical cell 202, with the anode layer 110 of the second electrochemical cell 204 contacting one or both of the exposed surface of the adhesive layer 208 and the portion of the anode current collector 206 that fills the gap 308. Pressure may be applied to the cathode current collectors 104 and/or substrate layers of the electrochemical cells 202, 204 to adhesively bond the adhesive layer 208 to the respective anode layers 110. The bonding of the adhesive layer 208 to the anode layers 110 may physically connect the electrochemical cells 202, 204 without the need for time-curing or ultraviolet light treatment. The anode current collector 206 may be trimmed to shorten the second portion 306 of the anode current collector 206 extending outward from the stacked electrochemical cells. For example, after bonding the adhesive layer 208 to the anode layers 110, second portion 306 may initially extend outward of the peripheries of the anode layers 110 by a first distance, and then a blade, laser, etc. may be used to cut through the anode current collector 206 to shorten the second portion 306 such that it extends outward of the peripheries by a second distance less than the first distance.

Thus, an electrochemical device having a stack of electrochemical cells bonded together by an intermediate adhesive layer and in electrical connection with an anode current collector may be formed.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An electrochemical device, comprising:
   a first electrochemical cell having a first electrolyte layer between a first anode layer and a first cathode layer;
   a second electrochemical cell having a second electrolyte layer between a second anode layer and a second cathode layer;
   an adhesive layer between the first anode layer and the second anode layer, wherein the adhesive layer includes a notch in a periphery; and
   an anode current collector electrically connected to the first and second anode layers and at least partially filling the notch between the first anode layer and the second anode layer.

2. The electrochemical device of claim 1, wherein the anode current collector includes a first portion disposed within the notch between the first anode layer and the second anode layer, and a second portion positioned outward of the periphery of the adhesive layer.

3. The electrochemical device of claim 2, wherein the first portion is adjacent to an edge of the adhesive layer extending around the notch.

4. The electrochemical device of claim 3, wherein the edge extending around the notch conforms to the first portion of the anode current collector.

5. The electrochemical device of claim 4, wherein the first portion of the anode current collector contacts the edge extending around the notch.

6. The electrochemical device of claim 1, wherein the adhesive layer and the anode current collector have a same thickness separating the first anode layer from the second anode layer.

7. The electrochemical device of claim 1, wherein the adhesive layer includes a pressure sensitive adhesive.

8. The electrochemical device of claim 1, wherein the first anode layer and the second anode layer directly contact a portion of the anode current collector at least partially filling the notch between the first anode layer and the second anode layer.

9. An electrochemical device, comprising:
   a first electrochemical cell having a first electrolyte layer between a first anode layer and a first cathode layer, and a first sidewall along a first outer edge of the first cathode layer;
   a second electrochemical cell having a second electrolyte layer between a second anode layer and a second cathode layer, and a second sidewall along a second outer edge of the second cathode layer;
   an adhesive layer between the first anode layer and the second anode layer, wherein the adhesive layer includes a notch in a periphery;
   an anode current collector between the first anode layer and the second anode layer, wherein the anode current collector is electrically connected to the first and second anode layers, and wherein the anode current collector at least partially fills the notch between the first anode layer and the second anode layer; and
   an insulator on the anode current collector and between the first sidewall and the second sidewall.

10. The electrochemical device of claim 9, wherein the anode current collector includes a first portion disposed within the notch between the first anode layer and the second anode layer, and a second portion positioned outward of the notch.

11. The electrochemical device of claim 10, wherein the first portion of the anode current collector contacts an edge of the adhesive layer extending around the notch.

12. The electrochemical device of claim 9, wherein the adhesive layer and the anode current collector have a same thickness separating the first anode layer and the second anode layer.

* * * * *